United States Patent

[11] 3,594,078

| [72] | Inventor | Walter J. Hall<br>Evanston, Ill. |
|---|---|---|
| [21] | Appl. No. | 808,039 |
| [22] | Filed | Mar. 12, 1969 |
| [45] | Patented | July 20, 1971 |
| [73] | Assignee | GAF Corporation<br>New York, N.Y. |

[54] STACK-TYPE SLIDE CHANGER FOR USE WITH A SLIDE DISPLAY DEVICE HAVING A GATE OPEN AT THE TOP THEREOF
13 Claims, 13 Drawing Figs.

| [52] | U.S. Cl. | 353/111 |
|---|---|---|
| [51] | Int. Cl. | G03b 23/02 |
| [50] | Field of Search | 353/111, 112, 116, 117 |

[56] References Cited
UNITED STATES PATENTS

| 2,968,218 | 1/1961 | Walter | 353/116 |
|---|---|---|---|
| 3,171,222 | 3/1965 | Sakaki et al. | 353/118 |
| 3,427,739 | 2/1969 | Robinson | 40/79 |

*Primary Examiner*—Harry N. Haroian
*Attorney*—McDougall, Hersh and Scott

ABSTRACT: A slide loader is mounted over a vertical projection gate open at the top thereof. The slide loader includes supply and takeup magazines for supporting slides in face-to-face contact. A pair of members engage edge portions of the foremost slide in the supply magazine for rocking such slide to separate the same from the adjacent slide and to orient such foremost slide with a discharge opening at the outlet end of the supply magazine. A shiftable plate receives the foremost slide after it passes through such discharge opening and holds the slide over the gate in readiness for dropping thereinto. Upon movement of this plate to a release position, the foremost slide is allowed to drop into the projection gate.

PATENTED JUL 20 1971

INVENTOR
WALTER J. HALL
BY *Reid, Lockwood, Greenawalt & Dewey*
ATT'YS.

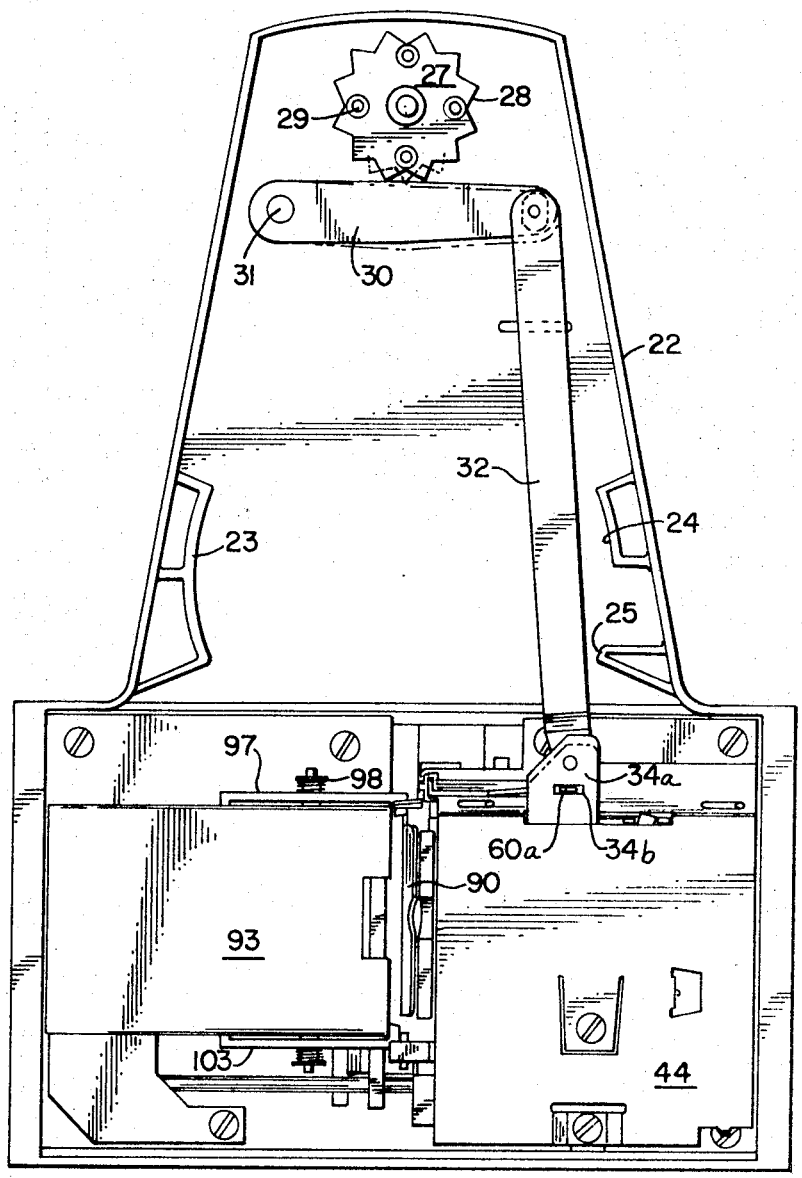

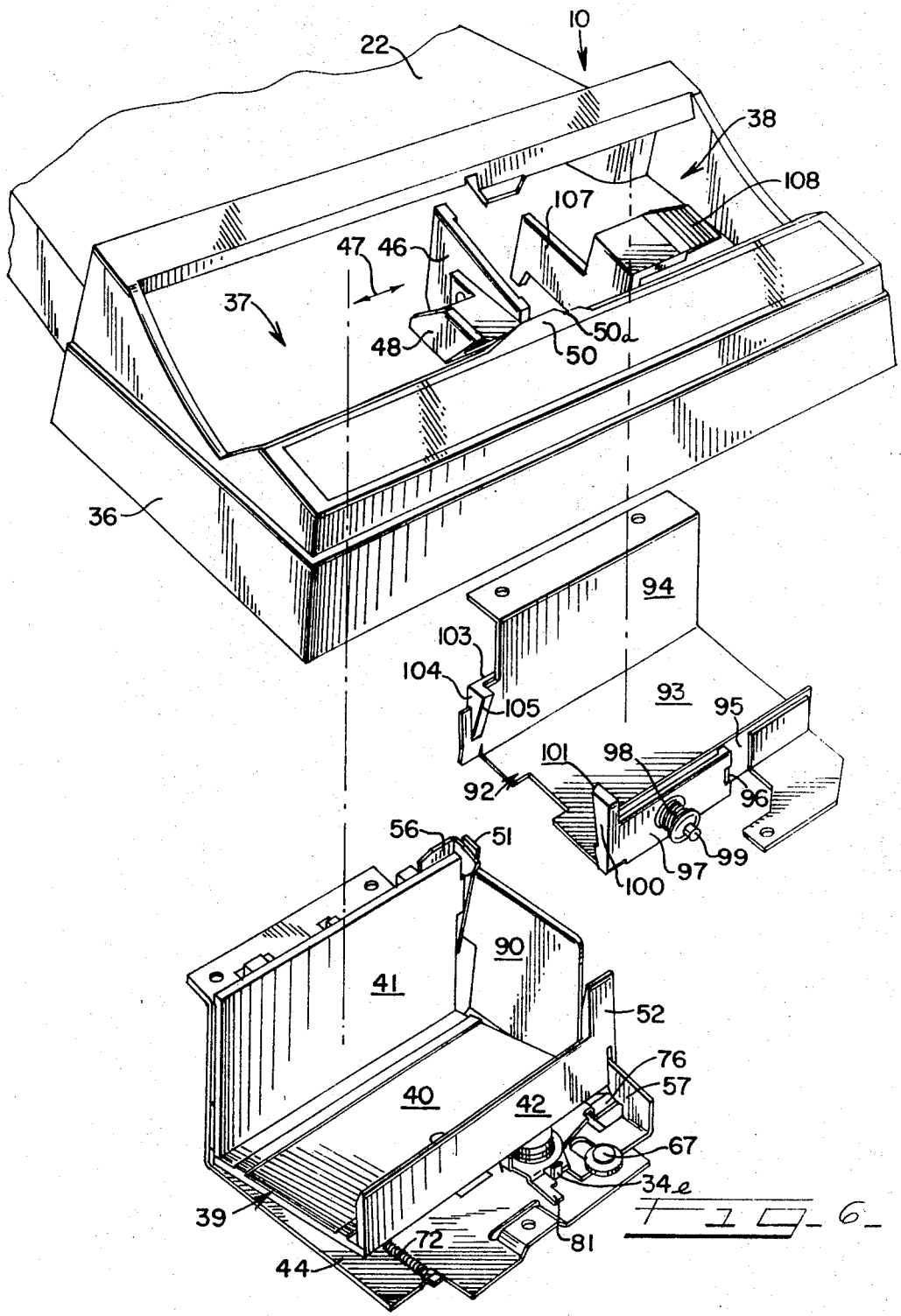

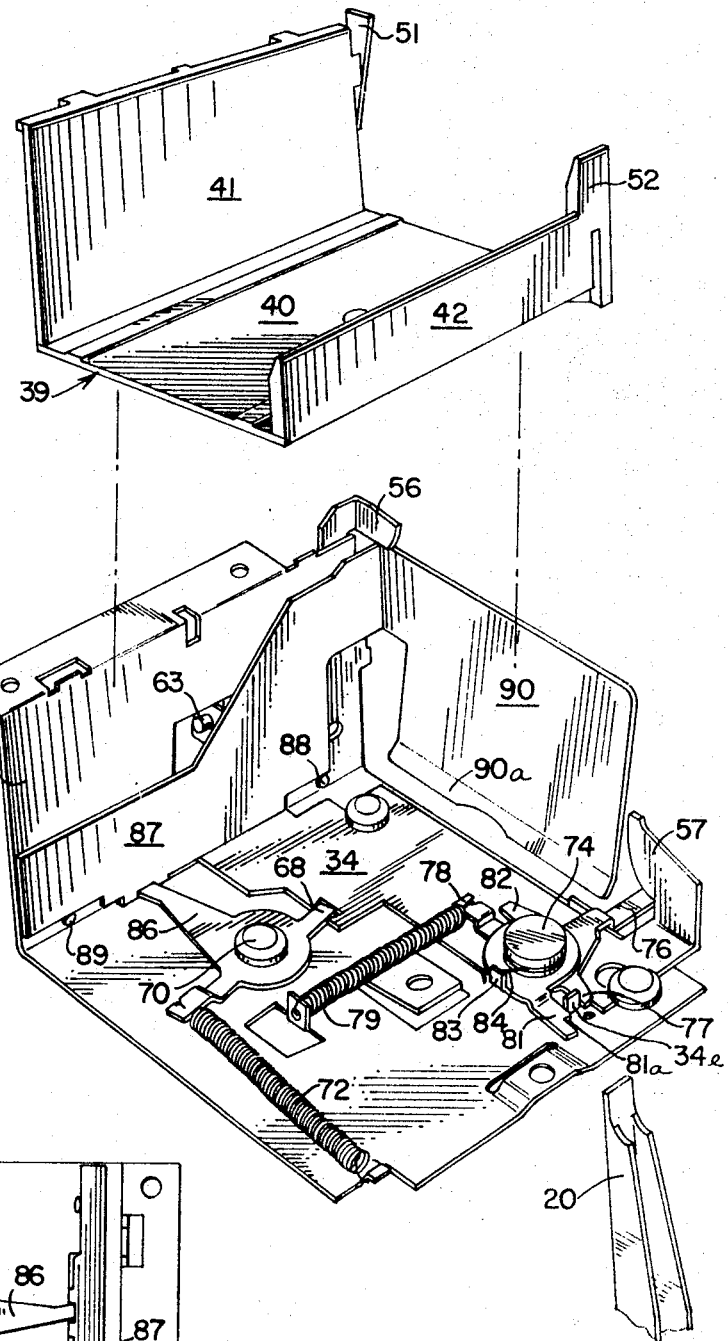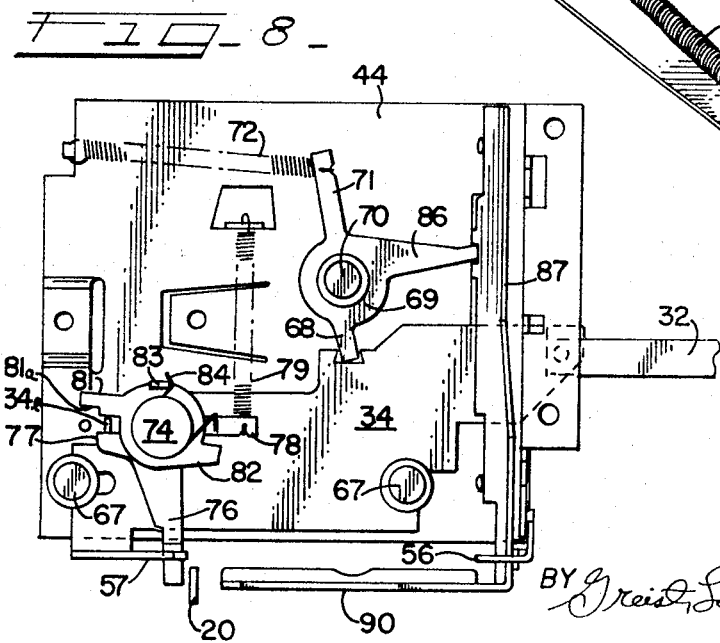

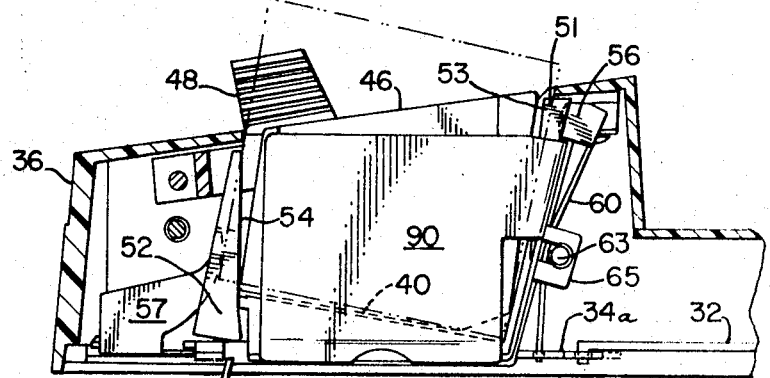
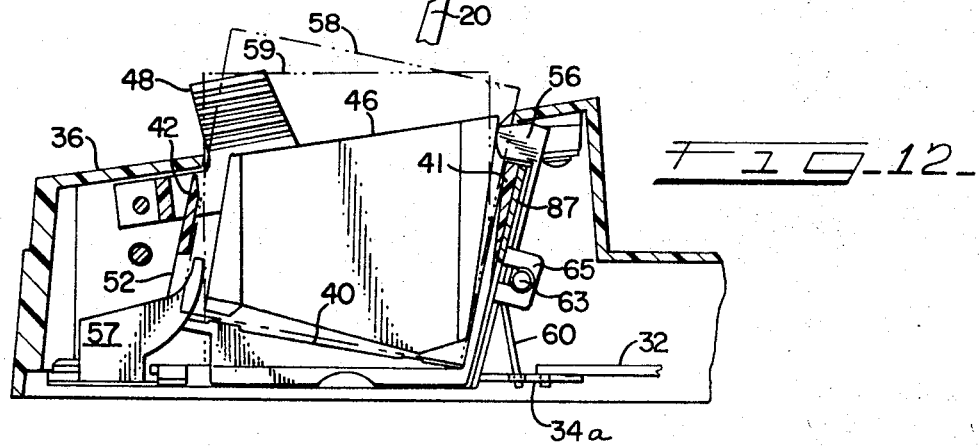
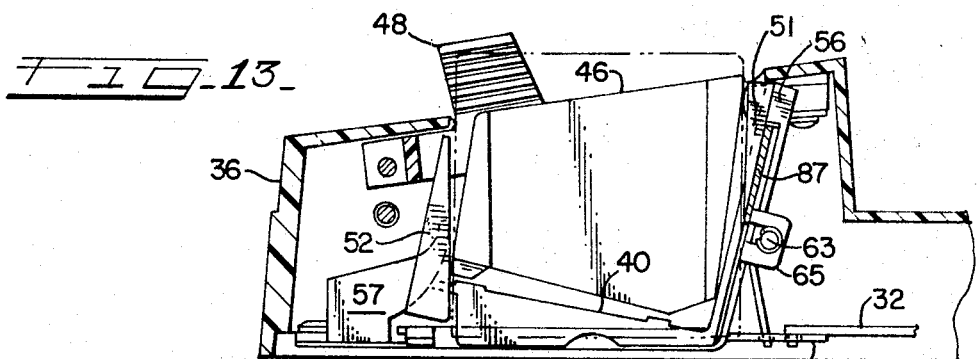

STACK-TYPE SLIDE CHANGER FOR USE WITH A SLIDE DISPLAY DEVICE HAVING A GATE OPEN AT THE TOP THEREOF

OBJECTS OF THE INVENTION

A primary object of the present invention is the provision of a new and improved slide changer for use with a magazine wherein slides are held in face-to-face contact.

Another primary object of the present invention is the provision of a new and improved slide loader for use with a projection gate which is open at the top thereof.

Another object of the present invention is the provision of a new and improved slide loader which may be readily mounted on the top of the slide projector and which is actuated by the same slide projector members used to operate a circular slide tray, the latter and the slide loader being alternately usable with the slide projector.

These and other objects and advantages of the invention will become apparent from the following specification disclosing a preferred embodiment shown in the accompanying drawings.

DESCRIPTION OF THE DRAWINGS

FIG. 3 is an enlarged bottom plan view of the slide loader;

FIG. 6 is an enlarged, exploded, perspective view of the slide loader;

FIG. 7 is an enlarged, exploded, perspective view of a subassembly of the slide loader;

FIG. 8 is a top plan view of a portion of the subassembly shown in FIG. 7;

FIG. 11 is an enlarged section taken along line 11-11 of FIG. 2;

FIG. 12 is a section similar to FIG. 11 with certain of the parts removed for better illustration of other parts; and FIG. 13 is a section similar to FIG. 11 and showing certain of the movable members in a different position.

DESCRIPTION OF THE PREFERRED EMBODIMENT

Figure 2:
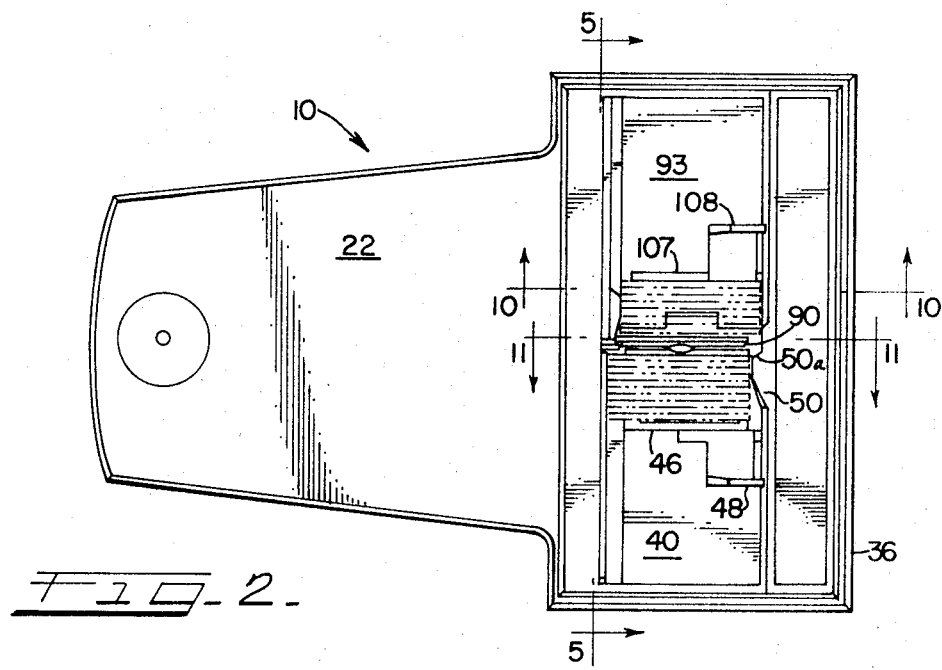
FIG. 2 is an enlarged top view of the slide loader.
Figure 1:
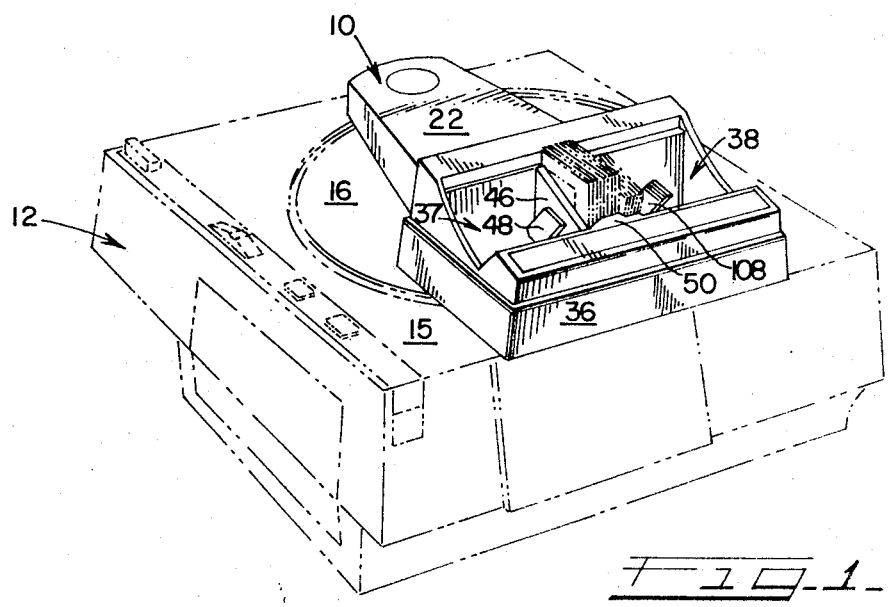
FIG. 1 is a perspective view showing the slide loader mounted on a slide projector.
Figure 4:
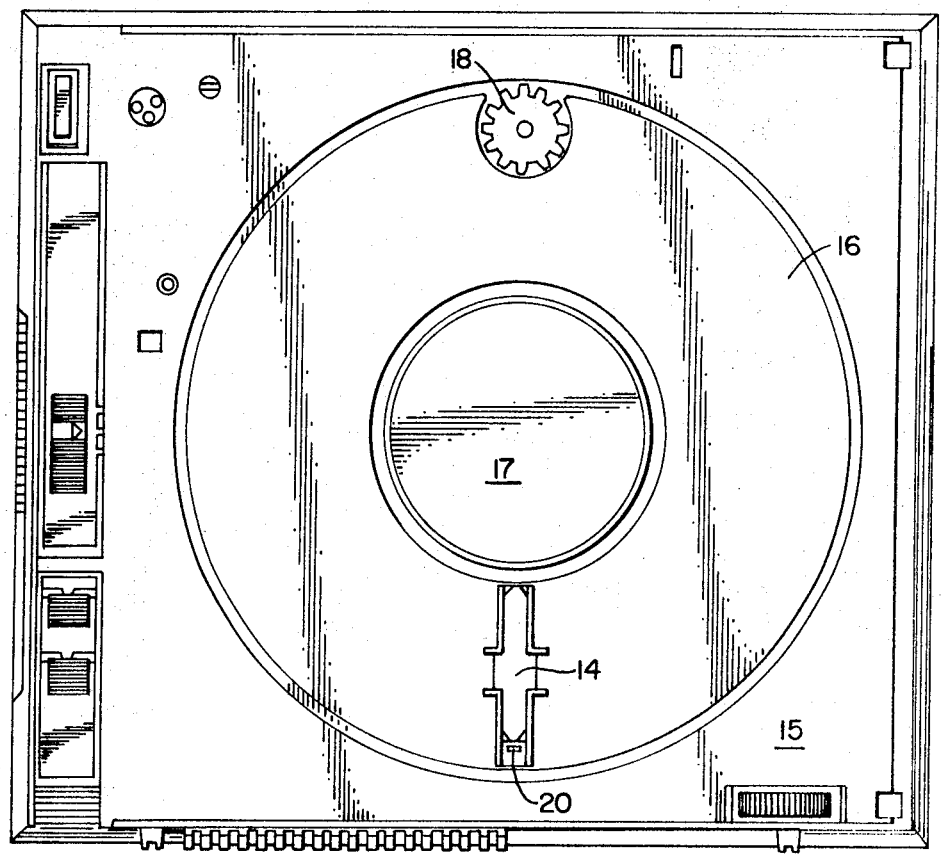
FIG. 4 is an enlarged top view of the slide projector shown in FIG. 1.
Figure 5:
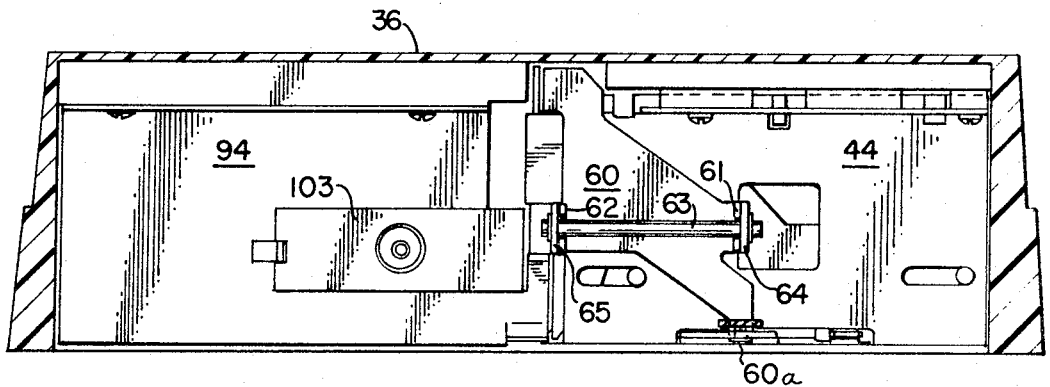
FIG. 5 is an enlarged section taken along line 5-5 of FIG. 2.
Figure 10:
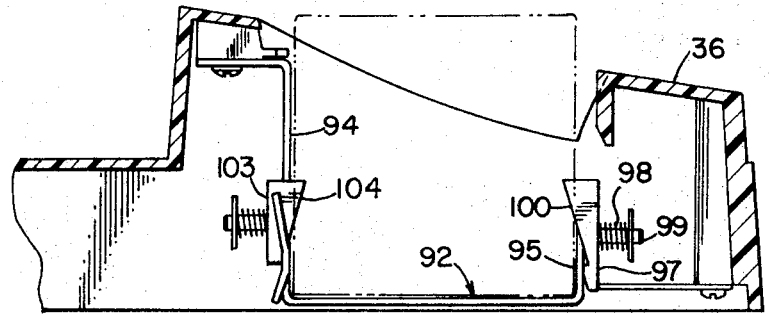
FIG. 10 is an enlarged section taken along line 10-10 of FIG. 2.

Referring particularly to FIGS. 1 and 4, the slide loader of this invention, generally designated 10, is shown mounted on the top of a slide projector, generally designated at 12. This projector includes a vertical projection gate open at the top thereof by means of a slot 14 in the top 15 of the slide projector housing. The slide projector has an annular raceway 16 and a central hub 17 for rotatably supporting a circular slide tray (not shown) in horizontally disposed relation. The projector includes an indexing gear 18 engageable with teeth on such circular tray for intermittently advancing the latter to present successive slides over the projection gate. The slide changing mechanism (not shown) within this projector includes a slide releasing arm 20 which engages a spring finger in the aforementioned circular tray thereby to deflect such finger for allowing a slide to drop into the projection gate. The slide changing mechanism within the projector operates the indexing gear 18 and slide releasing arm 20 in timed relation such that a slide will be released just after it has been presented over the projection gate. For a complete description of the nature and operation of the slide projector and circular tray, reference should be made to the copending application of Walter J. Hall, Ser. No. 684,202, filed Nov. 20 1967, now U.S. Pat. No. 3,499,708.

The slide loader 10, in the embodiment shown for purposes of illustration, is intended to be used alternately with the aforementioned circular slide tray. To this end, the slide loader includes a first housing shell 22 open at the bottom thereof (FIG. 3) and provided with arcuate surfaces 23, 24 and 25 which engage the sidewall of the hub 17 for centering and locating the slide loader on the projector. The housing shell 22 rotatably mounts a cam 27 having a plurality of circumferentially disposed cam projections 28. This cam includes a plurality of axially extending pins 29 which extend between the teeth on the indexing gear 18 thereby to provide for driving of the cam 27 by the gear 18.

It will be noted that the cam projections 28 engage a link 30 mounted at one end thereof on a fixed pivot 31. The other end of this link is pivotally mounted to one end of another link 32, the other end of the latter being pivotally connected to a tab 34a integral with an actuating plate 34. It will be understood that when the cam 27 is in a position such that two of the projections 28 engage the edge of the link 30, the latter will occupy the solid line position of FIG. 3; when only one of the projections 28 engages the link 30 the latter will occupy the broken line position. It is therefore apparent that as the cam 27 is stepped or rotated, the link 30 will be swung between its solid and broken line positions. This movement of the link 30 imparts a substantially reciprocal movement to the link 32 for imparting corresponding movement to the actuating plate 34 for purposes to be explained hereinbelow. It will be understood that link 32 is located at a horizontal level such that it passes over the top of the hub 17 on the slide projector.

Referring now particularly to FIG. 6, the slide loader 10 includes a second housing part or shell 36 having supply and takeup areas 37 and 38, respectively. The supply area consists of a supply magazine defined primarily by a member 39 including a floor 40 and sidewalls 41, 42. This member 39 is suitably mounted to an angle member or plate 44, the latter being mounted by suitable fasteners to the housing shell 36. As indicated in FIG. 11, the member 39 supports a stack of slides with their upper and lower edges at an angle with the horizontal.

The supply magazine further includes a slide pusher plate 46 which is movable in the directions indicated by the arrow 47 in FIG. 6. This pusher plate is mounted by suitable means (not shown) including spring means for urging the plate 46 from left to right (FIG. 6) thereby to urge slides in the supply magazine in a feed direction. A handle or thumb member 48 is connected to the pressure plate 46 to allow withdrawing of the latter for loading slides in the supply magazine. The shell 36 includes an integral cam 50 which engages the slides as they reach the outlet end of the supply magazine for camming these slides such that their edges adjacent the walls 40 and 41 will be in coextensive contact with these walls. The cam 50 is notched, as at 50a, to cooperate with rocking members (to be described below) such that slides in the supply magazine will be separated one at a time.

The member 39 includes integral ears 51 and 52 (FIGS. 6 and 11) which have vertical edges 53, 54, respectively, defining an exit or outlet opening for the supply magazine. The foremost slide in the supply magazine will be pressed against the ears 51, 52 by the action of the pushing member 46. This foremost slide cannot pass out of the supply magazine until such slide is rocked in its own plane to a position wherein its side edges are in parallel relation with the surfaces 53, 54. When the foremost slide is rocked in this position, it will then be allowed to pass through the opening defined by the surfaces 53, 54, this movement being imparted to the foremost slide by the action of the pusher 46.

The foremost slide in the supply magazine is rocked into a position for passing between the surfaces 53, 54 by means of a pair of rocking members 56, 57, the latter member being integral with the actuating plate 34 as best seen in FIG. 7. The walls 41, 42 of the member 39 are provided with slots to accommodate the rocking members 56, 57. These rocking members move inwardly simultaneously for engaging edges of the foremost slide adjacent opposite corners thereof for rocking such slide from the phantom line position 58 (FIG. 12) to the phantom line position 59.

Referring particularly to FIGS. 5 and 11—13, the rocking member 56 is integral with a plate 60, the latter having pairs of ears 61, 62 mounting the plate 60 for swinging movement about a pin 63. This pin is supported at its opposite ends from ears 64, 65 struck from the upstanding portion of the angle plate 44. As noted in FIGS. 11—13, the plate 60 is bent generally along the line defined by the pin 63. The lower end of the plate 60 terminates in a small integral tab 60a (FIG. 3) which is received in a slot 34b formed in the actuating tab 34a. It will be apparent that shifting movement of the actuating plate 34 causes rocking movement of the plate 60 for moving the rocking member 56 between extended and retracted positions.

Figure 9:
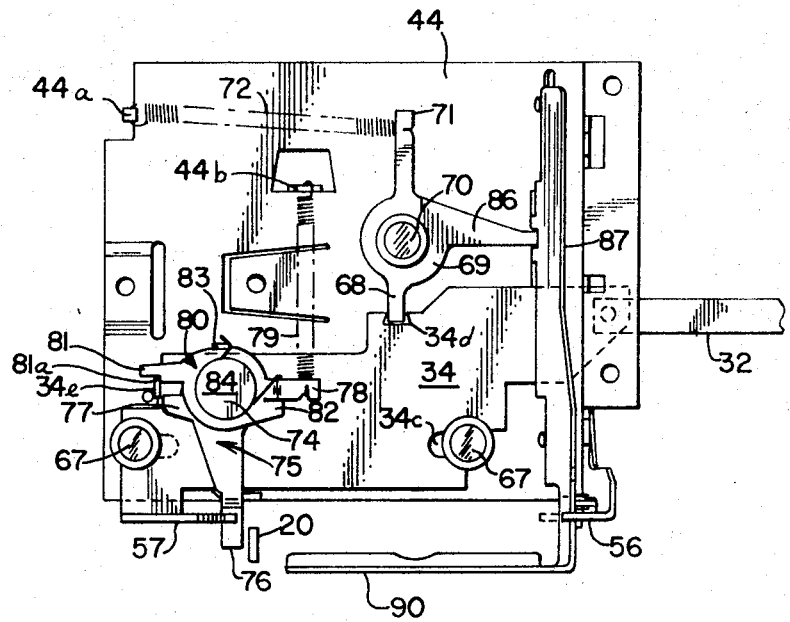
FIG. 9 is a plan view similar to FIG. 8 and showing certain of the parts in a different position.

Turning now primarily to FIGS. 8 and 9, the actuating plate 34 is slidably mounted on the horizontal portion of the angle plate 44. To this end, the actuating plate 34 is provided with open-ended slots 34c slidably engaging fasteners 67. The actuating plate includes a cutout or notch 34d receiving one arm 68 of the member 69 pivoted about a pin 70, the latter being supported by the angle plate 44. The member 69 includes another arm 71 engaged with one end of a spring 72, the other end of this spring being connected to an ear 44a. It will be understood the spring 72 acts to urge the plate 34 to the right as seen in FIGS. 8 and 9.

The plate 44 mounts another pin 74. The plate 34 is provided with an opening (not shown) receiving the pin 74 such that the latter does not interfere with movement of the former. This pin mounts a member 75 having a first arm 76, a second arm 77, and a third arm 78. A spring 79 is connected to the arm 78; the other end of this spring is connected to a tab 44b struck from the plate 44. The spring 79 acts to urge the member 75 in a counterclockwise direction as seen in FIGS. 8 and 9.

The pin 74 mounts another member 80 having a first arm 81 (including a notched surface 81a), a second arm 82 which is adapted to abut the arm 78 and a third upstanding arm 83. The spring 79 holds the notched surface 81a in engagement with an ear 34e on the actuating plate. A wire spring 84 is coiled a few times around the pin 74, opposite ends of this spring engaging the upstanding arm 83 and the arm 78 for urging arms 78 and 82 into abutting engagement with each other.

As seen in FIG. 7, the member 69 includes a third arm 86 which is received within a cutout formed along the bottom surface of a shiftable plate 87. This plate has notched edges along the bottom side thereof riding on pins 88, 89 mounted from the upstanding portion of the angle plate 44. The plate 87 is therefore mounted for shiftable or reciprocal movement in the space defined between the upstanding portion of the plate 44 and the wall 41 of the member 39. Another plate 90 is integral with the plate 87 and is contained in a vertical plane at a right angle with the latter. This plate 90 includes a bent portion 90a extending along its bottom for a purpose to be explained hereinbelow.

Turning back to FIG. 6, the takeup area includes a takeup magazine defined primarily by a member 92 having a floor 93 and sidewalls 94, 95. The member 92 is connected to the housing shell 36 by suitable fasteners such that slides are received and supported in the takeup magazine with their upper and lower edges substantially horizontal.

The sidewall 95 has an integral tab 96 struck therefrom, this tab being received in a notch formed in one end of a catch member 97. A spring 98 is mounted on a pin 99, the latter being supported from the wall 95. This spring urges the catch member 97 inwardly in substantial coextensive relation with the wall 95 but at the same time will allow the catch member to be deflected outwardly for pivoting about the engagement defined by the tab 96 and the notched portion of the catch plate. The catch 97 includes an ear 100 having a beveled surface 101.

Another catch member 103 (FIGS. 5 and 6) at opposite hand to but otherwise identical an elevation the catch member 97 is mounted on the wall 94. This catch member, which is mounted in the same manner as the catch 97, includes an ear 104 with a beveled surface 105. The ears 100, 104 define the entrance to the takeup magazine. The beveled surfaces 101, 105 cause the catch members to be cammed outwardly as the slide is forced into the takeup magazine. As soon as the slide passes beyond the surfaces 101, 105, the catches 97, 103 snap toward each other behind the slide just received in the takeup magazine for holding such slide therein.

A pusher plate 107 is mounted in the takeup magazine by suitable means (not shown) including spring means for urging this pusher plate from right to left as viewed in FIG. 6. This pusher plate maintains the slide in the takeup area in vertical, face-to-face relation. The pusher plate 107 includes an integral tab or handle 108 allowing the pusher plate to be readily withdrawn for removing slides from the takeup area.

The operation of the slide loader according to the present invention is as follows:

Assume that a supply of slides is contained in the supply magazine. The rocking members 56, 57 will be in their innermost positions. The foremost slide in the supply magazine will be forced against the faces of the members 56, 57 by the action of the pusher plate 46. The shiftable plate 90 will be in the position shown in FIG. 8, which may be termed the "hold" position. As the slide changing mechanism within the slide projector is actuated, a slide lifting member (not shown) comes into play for lifting the slide from the projection gate for returning the same to the takeup magazine. In the present example, we are assuming a slide has not yet been presented to the projection gate in the projector. The slide changing mechanism in the projector next serves to index the gear 18. This will cause movement of the cam 27 for shifting the actuating plate 34 from right to left as viewed in FIGS. 8 and 9. This will result in the retraction of the rocking members 56, 57. The shifting movement of the actuating plate 34 will also cause rocking of the member 69 thereby to shift the plate 90 from its position shown in FIG. 8 to its position shown in FIG. 9, the latter position being termed the "release" position. The foremost slide in the supply area will now be urged against the ears 51, 52.

The slide changing mechanism in the projector will next cause movement of the releasing or tripping member 20. The upper end of this member will strike the arm 76 on the member 75 thereby to swing the latter in a clockwise direction as shown in FIGS. 8 and 9. This will cause the rocking members 56, 57 to move together from the retracted position to their inner positions thereby striking edges of the foremost slide adjacent opposite corners thereof for rocking such slide until its side edges come into parallel relation with the edges 53, 54 on the members 51, 52. The pusher plate 46 will now urge the foremost slide through the opening defined by the edges of surfaces 53, 54. Simultaneously with this movement of the rocking members 56, 57, the shiftable plate 90 will move from its release position of FIG. 9 to its hold position of FIG. 8. The shiftable plate 90 will catch or hold the foremost slide and support the same in a position just over the projection gate.

Now, in the next cycle of operation, when the plate 90 moves from the hold position to the release position, a slide will be allowed to drop by gravity into the projection gate of the projector. It will be understood that the lip 90a on the bottom of the shiftable plate 90 serves to adapt or aid the plate 90 in holding a slide in position to be dropped into the gate. As the plate 90 is shifted from its hold to its release position thereby to allow a slide to drop into the gate, the next slide in the supply magazine will be allowed to come into contact with the ears 51, 52, as the rocking members 56, 57 will be withdrawn simultaneously with such movement of the shiftable plate.

When the slide changing mechanism within the slide projector lifts the slide from the projection gate, such slide will be elevated into a position on the other side of the shiftable plate 90. Therefore, during the next time that the plate 90 moves from its hold to its release position for allowing a successive slide to drop into the gate, this movement of the shiftable plate will serve to force a slide (the one that was just projected) between the catch members 97, 103 and into the takeup magazine. The plate 90 serves the dual purpose of releasing slides one at a time for dropping into the projection gate and of forcing the slides into the takeup magazine.

Looking more specifically into the operation of the actuating plate 34, as the same is moved from right to left from the position in FIG. 8 to the position in FIG. 9, the notched end 81a will snap behind the upstanding ear 34e thereby momentarily to hold the actuating plate in the position shown in FIG. 9. The spring 84 serves to swing the member 86 such that the surface 81a will snap behind the ear 34e. It is at this time that the rocking members 56, 57 are withdrawn and the shiftable plate 90 moved from its hold position thereby to allow a slide to drop into the gate of the slide projector. Almost immediately after this occurs, the tripping member 20 in the slide projector will strike the arm 76 for swinging the member 75 in a clockwise direction. By reason of the engagement between the arms 78, 82, the member 80 will be swung in a clockwise direction disengaging the notched end 81a from the ear 34e thereby to allow the actuating plate 34 to swing from left to right under the influence of the spring 72. The plate 34 will move from left to right until the ear 34e strikes the end of arm 77; that member is now in the path of the ear 34e by reason of the slight clockwise rotation imparted to the member 75. At this stage of operation, the shiftable plate 90 will be approximately midway between its hold and release positions (the members 56, 57 will also be at the approximate midpoint of their paths of travel at this time).

The tripping member 20 now reverses its direction of movement and allows the member 75 to swing in a counterclockwise direction under the influence of the spring 79. This will result in disengagement of the arm 77 from the ear 34e allowing the latter to move into the space between the arms 77 and 81. The plate 34 will now have returned to its position in FIG. 8 whereupon the shifting plate 90 will have returned to its hold position and the rocking members 56, 57 will have served to separate the foremost slide from the adjacent slide in the stack, whereupon such foremost slide will be received and held by the plate 90 in the position of readiness for another cycle of operation.

As will be apparent from the above description, the rocking members 56, 57 serve as a means for separating the slides one at a time from the stack of slides in the supply magazine. This mechanism is virtually foolproof thereby preventing jams which would result if more than one slide were to be released from the supply stack at any one time. As mentioned above, the cam surface 50a aids to ensure separation of only one slide at a time from the supply stack.

The slide loader shown for purposes of illustration has been specially designed for use with the aforementioned Hall slide projector. However, it is readily apparent the present invention is not limited for use with such projector. The embodiment shown for purposes of illustration is in the form of an attachment to be used alternately with a circular slide tray as explained above. The slide loader of the present invention is not to be limited for use in such an arrangement as, for example, it is apparent the slide loader according to the present invention could be an integral part of a slide projector.

I claim:

1. In a slide changer for use with a slide feed magazine wherein a plurality of slides are held in face-to-face relation, the improvement comprising, first means adjacent one end of said magazine defining an opening for allowing passage of a slide therethrough only when said slide occupies a first angular position in its own plane, second means forming part of said magazine for supporting slides therein such that each slide occupies a second angular position in its own plane which is different from said first angular position, and cyclically operable means including a pair of movable members arranged to engage edges of the foremost slide in said magazine adjacent opposite corners of such slide thereby to rotate the latter in its own plane from said second position to said first position.

2. A slide loader for use with a slide display device having means defining a projection gate which is open at the top thereof for permitting passage of a slide in its own plane to and from said gate, said loader comprising:
   a. a feed magazine for supporting a plurality of slides in face-to-face contact and at an elevation above said gate;
   b. said magazine including supporting means for holding the slides therein such that each slide occupies a first angular position in its own plane;
   c. means disposed substantially over said gate and adjacent one end of said magazine for defining an opening allowing passage of a slide therethrough only when such slide occupies a second angular position in its own plane which is different from said first angular position;
   d. cyclically operable means including movable means for engaging edge portions of the foremost slide in said magazine for swinging the same in its own plane from said first to said second position whereupon such slide may pass through said opening; and
   e. other means for causing movement of said foremost slide through said opening and into said projection gate.

3. The slide loader according to claim 2 further defined by:
   a. said other means including a shiftable plate mounted over said projection gate;
   b. fixed means mounted adjacent said opening and cooperating with said plate for releasably holding a slide over said gate; and
   c. actuating means for shifting said plate thereby to release the slide for dropping into said gate.

4. The slide loader according to claim 3 wherein a substantial portion of said plate is in parallel relation with the slides in said magazine, said plate having a lip engageable with the lower edge of the slide for releasably holding the same in cooperation with said fixed means.

5. The slide loader according to claim 3 further defined by:
   a. a takeup magazine; and
   b. catch means in the takeup magazine and cooperating with said plate such that a slide is forced into the takeup magazine by said plate upon shifting movement of the latter in releasing another slide for dropping into said gate.

6. The slide loader according to claim 2 wherein said movable means include a pair of elements engageable with edge portions of said foremost slide adjacent opposite corners thereof.

7. In combination:
   a. a slide projector having a projection gate and slide changing means including a slide tray indexing member and a slide releasing member, the latter being adapted to cooperate with a slide tray for releasing slides one at a time therefrom;
   b. a slide loader for use with said projector alternately with said slide tray, which loader includes means defining a feed magazine wherein slides are supported in face-to-face contact;
   c. said loader including release means for allowing passage of said slides one at a time to said projection gate;
   d. first means coupling said indexing member to said release means for moving the latter from a hold position thereby to release a slide; and
   e. second means coupling said releasing member with said release means to return the latter to said hold position.

8. The combination according to claim 7 further defined by:
   a. said loader including fixed means defining an opening through which a slide may pass only when the same occupies a first angular position in its own plane;
   b. said feed magazine including means for supporting said slides therein such that each slide occupies a second angular position in its own plane which is different from said first angular position;

c. said release means including movable members engageable with edges of the foremost slide in the feed magazine for rotating the same in its own plane from said second position to said first position;
d. said release means also including a shiftable element for momentarily holding a slide adjacent said projection gate after said slide has passed through said opening; and
e. said first means coupling said indexing member to said shiftable element and said second means coupling said releasing member with said movable members.

9. The combination according to claim 8 further defined by:
a. a takeup magazine; and
b. catch means in the takeup magazine cooperating with said shiftable element such that a slide is forced into the takeup magazine by said element upon shifting movement of the latter.

10. A slide changer for use with a slide display device of the type including a vertical projection gate open at the top thereof for entry and exit of a slide, said changer including:
a. a slide feed magazine for supporting a plurality of slides in vertical face-to-face relation and at an elevation above said gate;
b. pusher means in the magazine urging slides therein toward one end of the magazine;
c. first means adjacent said one end of the magazine and disposed substantially over said gate for defining an opening allowing passage of a slide therethrough only when said slide occupies a first angular position in its own plane;
d. second means forming part of said magazine for supporting slides therein such that each slide occupies a second angular position in its own plane which is different from said first angular position;
e. rocking means engageable with edge portions of the foremost slide in said magazine, which rocking means are movable back and forth between extended and retracted positions, movement of rocking means from the retracted position to the extended position serving to rock said foremost slide from its second position to its first position thereby to allow the same to pass through said opening;
f. shiftable means mounted over said gate and movable back and forth between a hold position and a release position, said shiftable means being adapted in its hold position to receive said foremost slide after the same passes through said opening thereby to hold such slide over said gate, said shiftable means upon movement toward its release position serving to allow the foremost slide to drop into said gate; and
g. operating means coupling said rocking means and said shiftable means for moving the latter to its hold position substantially simultaneously with movement of the former to its extended position and for moving the rocking means to its retracted position substantially simultaneously with movement of said shiftable means to its release position.

11. The slide changer according to claim 10 wherein said rocking means comprises a pair of elements arranged to engage the foremost slide only at the edge portions thereof adjacent opposite corner of such slide.

12. The slide changer according to claim 10 wherein said shiftable means comprises a vertical plate.

13. The slide changer according to claim 10 further defined by:
a. a takeup magazine for supporting slides at an elevation over said gate, the inlet end of said takeup magazine being disposed substantially over said gate; and
b. said shiftable means serving to force a slide into the takeup magazine upon movement of the shiftable means to its release position.